Nov. 19, 1940. A. H. BINCH 2,222,220
PRODUCTION OF WIRE CLIPS AND THE LIKE
Filed Feb. 27, 1939 4 Sheets-Sheet 1

Inventor
Arthur H. Binch,
by B. B. Collings.
Attorney

Nov. 19, 1940.  A. H. BINCH  2,222,220
PRODUCTION OF WIRE CLIPS AND THE LIKE
Filed Feb. 27, 1939  4 Sheets-Sheet 2
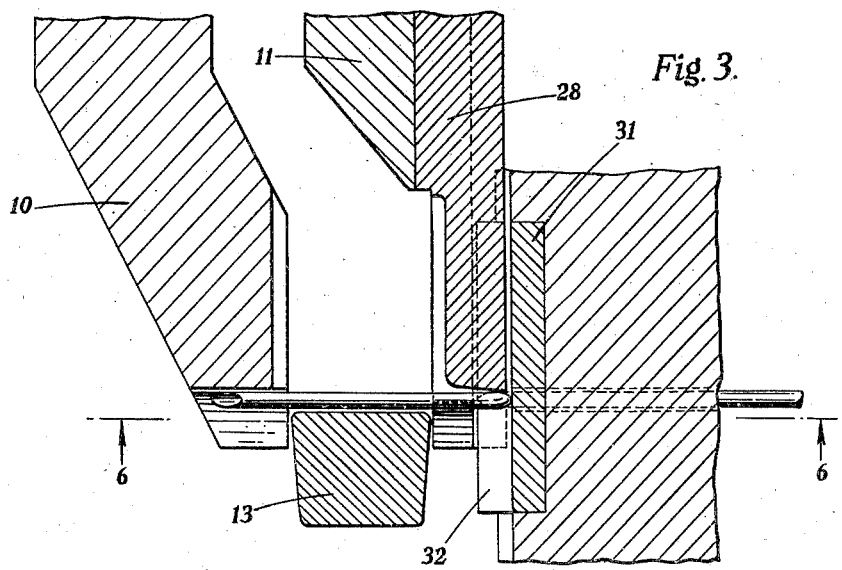
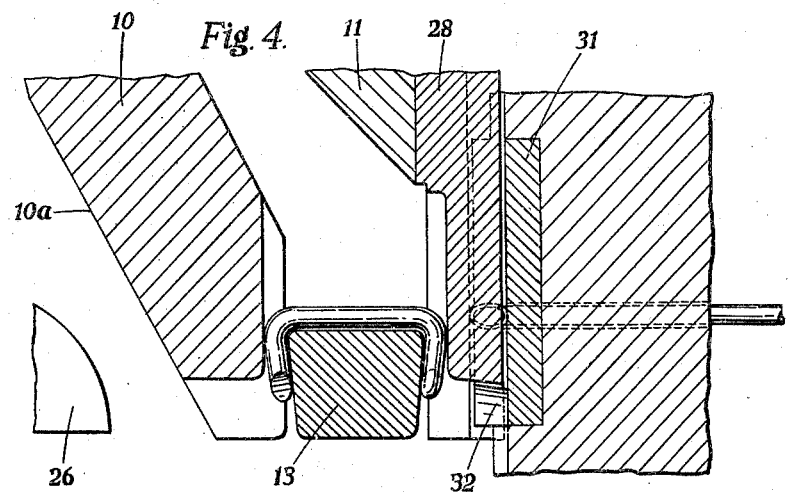
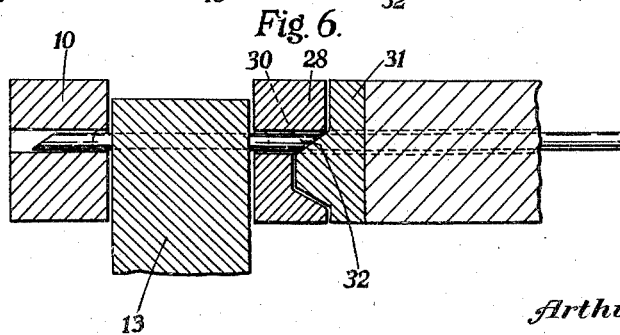
Inventor
Arthur H. Binch,
by [signature]
Attorney Nov. 19, 1940.    A. H. BINCH    2,222,220
PRODUCTION OF WIRE CLIPS AND THE LIKE
Filed Feb. 27, 1939    4 Sheets-Sheet 3

Inventor
A. H. Binch,
by
Attorney

Nov. 19, 1940.   A. H. BINCH   2,222,220
PRODUCTION OF WIRE CLIPS AND THE LIKE
Filed Feb. 27, 1939   4 Sheets-Sheet 4
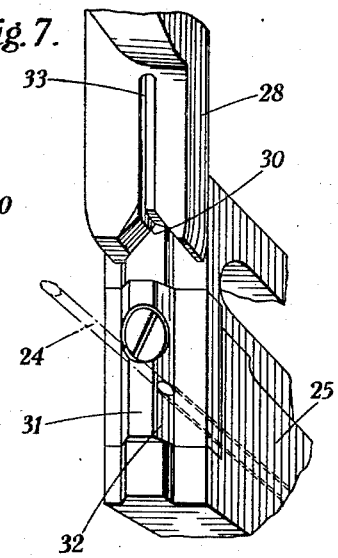
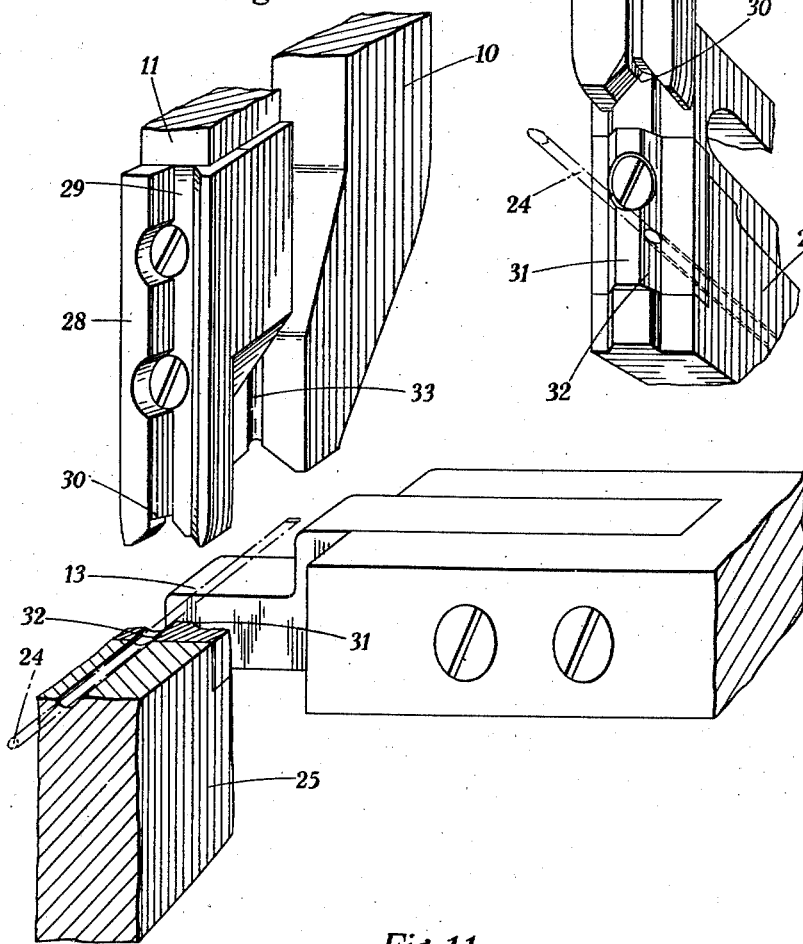
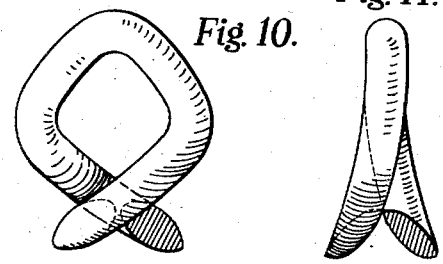
Inventor
Arthur H. Binch,
by *B.B.Collings*
Attorney Patented Nov. 19, 1940

2,222,220

UNITED STATES PATENT OFFICE 2,222,220

PRODUCTION OF WIRE CLIPS AND THE LIKE

Arthur Henry Binch, Lowdham, England, assignor to William Rhodes Limited, Leeds, England Application February 27, 1939, Serial No. 258,839
In Great Britain March 4, 1938

7 Claims. (Cl. 140—3)

This invention comprises improvements in or relating to the production of wire clips and the like.

More particularly, although not exclusively, the invention refers to the production of wire clips such as are employed for connecting together adjacent pocketed coil or upholstery springs embodied in spring mattresses, cushions or like spring assemblies. Usually clips employed for this purpose are cut from a length of wire, the cut lengths being bent to U-formation and when so formed caused to straddle adjacent parts of coil springs to be connected together, the two legs of the U being subsequently pressed together so as to cause the clip to encircle or embrace the spring coils.

Heretofore it has been customary to cut the wire at right angles to the length thereof, the two ends of the clip being thereby square and blunt; consequently in connecting together pocketed coil springs the fabric of the pockets appertaining to adjacent springs is usually pressed by the blunt ends of the clip beneath the wire coils to be connected without being actually pierced, and the efficiency of the connection depends in the main upon the strength or stiffness of the wire employed.

An important object of this invention is to produce clips which very easily pierce the pocket fabric during the operation of connecting pocketed springs, and which provide a more positive connection for said springs.

The present invention, according to one aspect thereof, provides a machine for making bent wire clips or the like, particularly a machine for making clips for connecting together coiled upholstery springs, comprising means functioning to bend into substantially U shape a portion of wire of the requisite length to form a clip, and means whereby the ends of the U-shaped portion are pressed together one over the other.

The machine also embodies means for producing pointed, tapered or sharpened ends to each length of wire to form the clip, said ends being caused to cross one another in the finished clip.

More particularly the machine in accordance with the present invention comprises in combination means for feeding the end portion of a length of wire stock to a cutting position, means for cutting from said stock the requisite length of wire to form a clip, said cutting means functioning to cut the wire obliquely or diagonally to the axis or length of said wire so as to form a sharpened, bevelled or tapered end to the severed length, means for bending the severed wire portion into substantially U-shape and means functioning to press the bevelled or tapered ends of the U-shape portion one over the other.

By the present invention an improved construction of wire clip is provided, applicable for use as a connecting element between adjacent pocketed springs of a spring mattress, cushion or the like, the improved clip consisting of a portion of wire shaped to a completed loop or ring formation and having its two ends tapered, bevelled or pointed, or similarly formed to provide sharp cutting or piercing extremities, which extremities cross or intersect one another in close engagement.

In order that the invention may be better understood, reference will now be made to the accompanying drawings wherein:

Figures 3, 4 and 5 are enlarged sectional detail views showing three successive steps in the production of a clip; Figure 5 showing the completed clip embracing and connecting end coils of adjacent pocketed springs.

Figure 6 is an inverted section on 6, 6 of Figure 3.

Figures 7 and 8 are enlarged details in perspective of the wire cutting and bending elements.

Figures 10, 11 and 12 are three views of a clip constructed in accordance with this invention.

Figure 1:
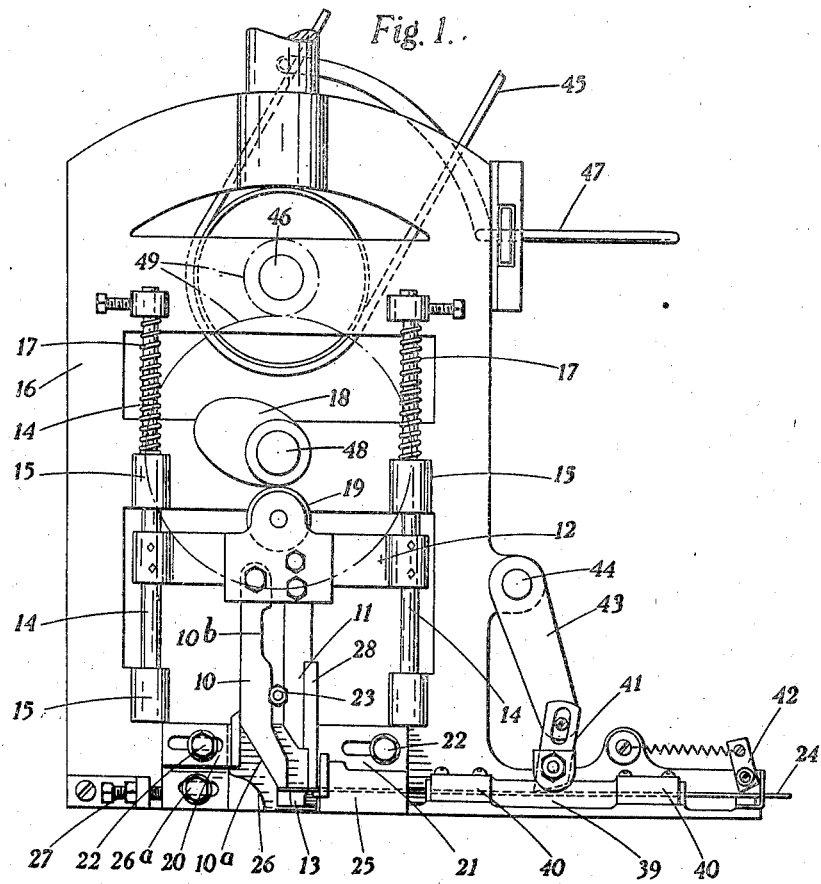
Figure 1 is a front elevation of a machine according to this invention for producing wire clips.

By way of example the invention will now be described as applied to a machine of the kind described in the specification of Patent No. 1,999,923. In this machine two wire bending jaws 10, 11 depend from a vertically movable cross head 12, there being a horizontally movable saddle member 13 adapted to be moved into and out of a position in which same lies between the lower ends of the bending jaws. The cross head 12 carrying the two bending jaws is fixed upon a pair of vertical rods 14 slidably mounted within bosses or bearings 15 constituting parts of the main frame 16, said cross head and rods 14 being moved downwards against the resistance of coiled compression spring 17 by suitable mechanism such as a rotary cam or eccentric 18 coacting with a roller 19 on the cross head 12. The one jaw 11 of the two bending jaws functions also as a wire cutter and is rigidly secured to the cross head, while the second jaw 10 is pivotally mounted so as to permit of lateral displacement. The two jaws extend down between a pair of guides 20, 21 which are adjustably connected by screw and slot connection 22 to a relatively stationary part of the machine frame; there being a headed pin or bolt 23 located between the jaws functioning to maintain same suitably spaced apart and assist in the proper guidance of the jaws in their vertical movement.

Wire 24 is fed forward from a suitable supply through a horizontal channel in a guide 25 so that the end portion of the wire is located across the saddle member 13 with the forward end of the wire below the pivoted jaw 10; and with the wire so disposed the two jaws are lowered in unison towards the saddle member so as first to cut off a length of wire to form a clip and then force the two ends of the severed length over or around the saddle member into substantially U-shape. The saddle is then withdrawn, and during the continued descent of the two jaws a bevelled face 10a of the pivoted jaw 10 coacts with a curved or bevelled member 26 and in so doing said jaw 10 is pressed towards the fixed jaw 11 so that the top bar or transverse portion of the U is bent between the jaws and the two ends of the severed wire portion are pressed together to form a clip of substantially ring, loop or diamond shape. The inner face of the pivoted jaw 10 is recessed at 10b to accommodate the pin 23 during this closing movement of the jaws, and the degree of closing is adjustable by slidably mounting the aforesaid member 26 and providing an adjusting screw 27 coacting with said member.

The part constituting the cutter advantageously comprises a short steel bar 28 screwed or otherwise renewably fixed in a recess at the lower end of the jaw 11; the cutter actually comprising the lower part of said jaw 11. If desired, however, the cutter may be constituted by an integral portion of the jaw. The movable jaw 10 and also the cutter 28 are grooved or recessed at their under faces, said grooves or recesses constituting, at the commencement of the cutting operation, a continuation of the feeding aperture or channel in the fixed member 25. The wire cutter 28 is formed with a diagonal or oblique cutting edge, that is to say a cutting edge which extends diagonally to the axis or length of the wire being severed, the cutter moving relatively to the fixed member 25 which is also provided with a part shaped or designed to conform to the diagonal cutting.

As best shown in Figs. 3 to 6, the diagonal cutting or knife edge on the movable cutter 28 is advantageously provided by recessing said cutter at its outer vertical face at 29, at least one side face of said recess 29 being bevelled and being so disposed as to extend diagonally or obliquely cross the wire-guiding groove at the bottom face of the cutter so as to provide a sharp diagonal cutting edge 30. The fixed wire-guiding member 25 with which the cutter slidably co-operates is formed on its vertical face with a projecting key or rib 31 adapted to have a close sliding fit within the vertical recess or groove 29 in the cutter 28. This projecting rib 31 has at least one side bevelled face 32 which extends diagonally across the wire feeding channel or aperture in the member 25 (see Figs. 6 and 7) and co-operates with the aforesaid diagonal cutting edge 30 during the cutting operation.

Advantageously the side recess 29 in the cutter 28 and the projecting rib 31 on the fixed wire-guiding part 25 are of substantially U or V shape in plan.

The key or rib 31 and the recess or groove 29 permit the two parts of the cutter to move relative to one another, as is required in cutting, but prevent their relative separation during the cutting act, a tendency toward which is induced by the fact that the faces 30 and 32 are diagonal.

It will be appreciated that as the cutter member 28 descends, the diagonal cutting edge 30 co-operates with the corresponding diagonal face 32 of the projection 31 to sever the length of wire and provide a sharp bevelled or tapering extremity to said wire see Fig. 6. After the length of wire has been severed, the cutter 28 (which as aforesaid constitutes a part of one of the pair of gripping jaws) continues to move downwards in unison with the pivoted jaw 10 and in so doing the severed length of wire is bent into inverted U-shape over the saddle 13. The bending or shaping of the wire is facilitated by providing a vertical groove 33 at the inner opposed faces of the two jaws. The saddle 13 is then withdrawn, and the two jaws continue their downward movement and carry between same the inverted U member over the adjacent ends of two pocketed springs 34 to be connected, it being understood that the springs have been brought into the requisite position beneath the jaws for this purpose. After the two legs of the inverted U member have been carried down on opposite sides of the two end coils of the springs 34 to be connected, the pivoted jaw 10 is pressed laterally towards the fixed jaw by virtue of the engagement of the bevelled face 10a of said jaw 10 with a curved or bevelled face of a relatively fixed member 26. This closing movement of the jaws bends or buckles the upper or transverse portion of the U member 35 (see Fig. 5) and in so doing presses the two legs 36 towards each other on the under side of the two wire coils 37 of the springs 34 to be connected. During this operation the sharpened, bevelled or diagonally cut ends of the U member 35 easily pierce the fabric of the pockets 38, and said ends by virtue of their tapered or bevelled formation readily slide one over the other when pressed together so that the ends of the two legs 36 of the completed clip cross or intersect each other and form a completely closed loop.

It is to be understood that the degree to which the two legs 36 of the clip cross one over the other can be readily adjusted by adjusting the distance to which the movable jaw is displaced laterally in relation to the fixed jaw; this being accomplished by adjustment of the member 26 by means of the screw 27, and by fixing said member 26 in the adjusted position by a headed screw 26a coacting with an elongated slot.

Any suitable means may be provided for intermittently feeding forward the requisite length of wire to be cut. In the arrangement illustrated the wire is fed towards the jaws through the intermediary of a friction device adapted to grip the wire, move forward the required length to be severed and then to release the wire and move back to its initial position. The gripping device may comprise a block or the like 39 slidable in guides 40 (Fig. 1) to and from the jaws 10, 11; the wire lying within a groove in the block. Located immediately above the wire-carrying groove in the block 39 is a short pivoted lever 41, the lower end of said lever having a cam face which, when the top end of the lever is swung over towards the jaws 10, 11 engages the wire and clamps same firmly on to the sliding block 39. When the wire is so clamped, further effort tending to move the upper end of the lever 41 towards the jaws causes the block 39, and with same the wire clamped thereto, to be moved towards the jaws. In this way the requisite length of wire is fed beneath the two jaws. After each feeding movement of the wire, the upper end of the lever 41 is rocked in the reverse direction. This releases the wire and slides the block 39 back to its initial position. The wire itself is, however, retained from backward movement with the block by a suitable gripping element, such for example as a spring-influenced pivoted finger 42 having a chisel edge engaging the wire.

The requisite rocking movement may be imparted to the lever 41 from an arm 43 having a pin and slot engagement with said lever 41 and fixed to rotate with a spindle 44 mounted in the machine frame, to which spindle a rocking movement is imparted. Any suitable means are provided for adjusting the distance to which the block 39 with the wire 24 is moved at each operation.

Figure 2:
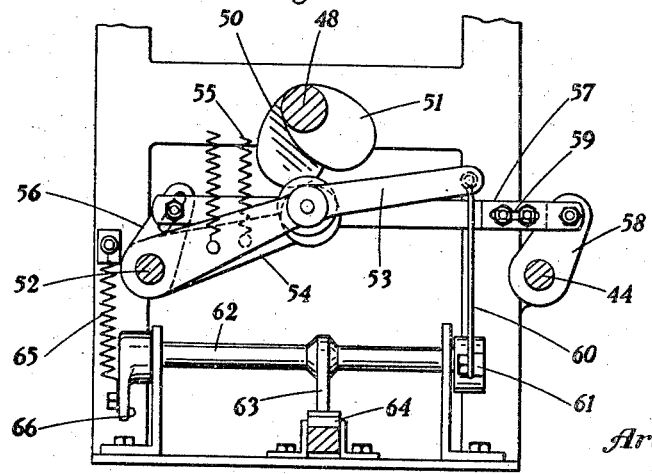
Figure 2 is a front sectional elevation of the lower part of the machine shown in Figure 1.
Figure 5:
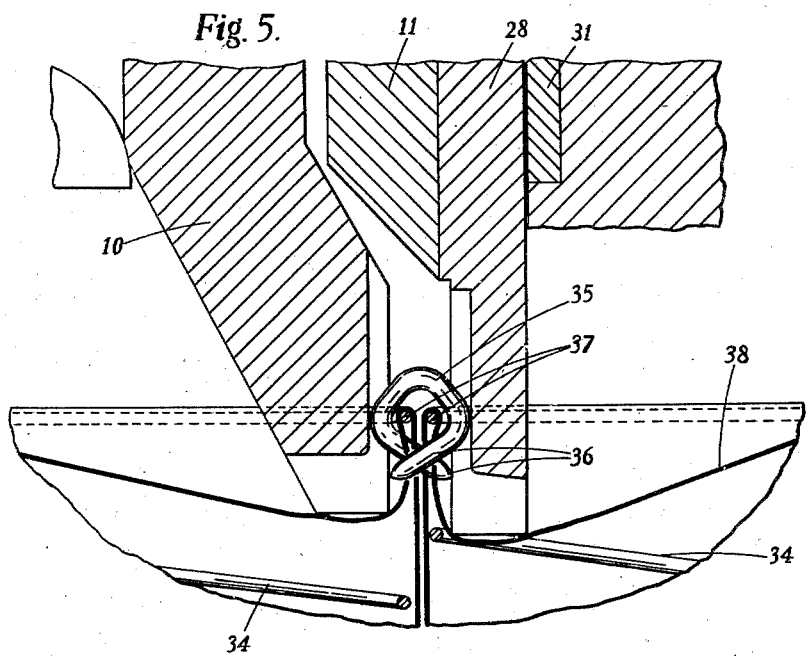
Figure 9:
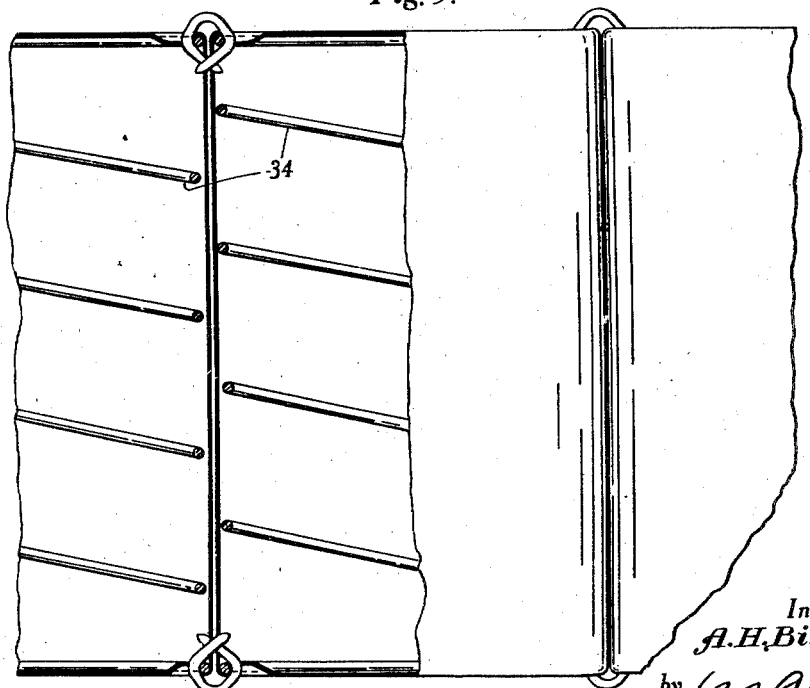
Figure 9 is a part sectional view of a portion of a pocketed spring assembly showing the end spring coils connected by clips.

It will be appreciated that the wire feeding lever 43 and the cam or eccentric 18 by which the jaws are forced down are driven in timed relation by suitable power means. For example, the machine may be driven by a belt 45 co-operating with fast and loose pulleys on a drive shaft 46, there being a suitable belt shifting lever 47 for moving the belt from the fast to the loose pulley and vice versa. From the drive shaft 46 the shaft 48 carrying the cam 18 is driven through reduction gearing indicated at 49. On the cam shaft 48 are also fixed two other cams 50 and 51, the cam 50 functioning to rock a third shaft 52 to control the wire feed movement, while the cam 51 functions to rock a lever 53 which controls the to and fro movement of the saddle member 13. The cam 50 co-operates with a follower at the end of an arm 54 secured to the shaft 52, thereby rocking said shaft against the influence of a spring 55. The rocking of the shaft 52 is communicated through a crank arm 56, connecting rod or bar 57 and a second crank arm 58, to the aforesaid shaft 44, to which the wire feed lever 43 is secured. It will therefore be appreciated that the feeding of the wire is effected by the depression of the lever 54 by the cam 50, while the return movement of the feeding mechanism is automatically effected by the spring 55. The connecting rod 57 is adjustable in length by any suitable means, such as by forming same in two parts and connecting the parts by belts and slots as indicated at 59 (Fig. 2), and by this adjustment the amount of wire fed at each feeding movement can be accurately and adjustably determined.

The cam 51 on the shaft 48 coacts with a follower on the arm 53 which is rotatable about the shaft 52 and at its free end is connected by a link 60 to the outer end of a crank arm 61 fixed to a horizontal shaft 62 (Fig. 2), said shaft carrying a quadrant 63 coacting with a rack 64 which has a horizontal sliding movement and carries at its one end the aforesaid saddle 13. Thus when the arm 53 is pivoted in one direction, the shaft 62 is rocked and through the quadrant and rack moves the saddle forward beneath the jaws. A spring 65 connected to a second crank arm 66 on the shaft 62 effects the return movement of the rack and saddle.

I claim:

1. A machine for making bent wire clips or the like, particularly a machine for making clips for connecting together coiled upholstery springs, comprising means for feeding the end portion of a length of wire stock to a cutting position, means for cutting from said stock the requisite length of wire to form a clip, said cutting means severing the wire obliquely or diagonally to the axis or length of said wire so as to form a sharpened, bevelled or tapered end to the severed length, means for bending the severed wire portion into substantially U shape and means for pressing the pointed cut ends of the U-shape portion one over the other.

2. A machine for making bent wire clips or the like, particularly a machine for making clips for connecting together coiled upholstery springs, comprising a saddle member, means for feeding the end of a length of wire to a cutting position across said saddle member, a pair of wire bending jaws, a wire cutting element associated with one of said jaws, said cutting element having a cutting edge disposed diagonally or obliquely to the axis or length of the wire to be severed, means for advancing the cutting element and bending jaws one on each side of the saddle member to cut the requisite length of wire to form the clip and to bend said wire over the saddle member into substantially U-shape, said cutter operating to produce a sharpened or tapered end to the severed wire, means for moving the saddle member to an inoperative position and means for causing the bending jaws to force the ends of the U-shape wire portion one over the other to form a completely closed loop.

3. A machine as claimed in claim 2, and including a relatively stationary member with which the movable cutter co-operates, said relatively stationary member being also formed with a part disposed diagonally or obliquely to the axis or length of the wire and co-operating with the diagonal cutting edge of the cutter to shear the wire and provide same with a sharpened or tapered end.

4. A machine as claimed in claim 2, wherein the wire cutter is constituted by a part moving in unison with one of the bending jaws and having a guided sliding movement on a relatively fixed member, and there being provided on the cutter a bevelled portion adapted to have a close sliding engagement with a correspondingly bevelled portion of the relatively fixed member and at least one of said bevelled portions terminating in a sharp cutting edge which extends diagonally to the axis or length of the wire being severed.

5. A machine for making bent wire clips or the like, particularly a machine for making clips for connecting together coiled upholstery springs, comprising a saddle member, means for feeding the end of a length of wire to a cutting position across said saddle member, a pair of wire bending jaws, a wire cutting element associated with one of said jaws, said cutting element having a cutting edge disposed diagonally or obliquely to the axis or length of the wire to be severed, a stationary member provided with a diagonal surface complemental to the diagonal cutting edge of said cutting element, a wire feed channel or passage in said stationary member extending laterally to the direction of movement of the cutter, said channel emerging at said diagonal surface of the stationary member, means for traversing the movable cutter to sever the wire and provide same with a tapered or bevelled end, means for operating the bending jaws to bend the severed wire to approximately U shape over the saddle member, means for withdrawing the saddle member, and means for partially closing said jaws on said U wire, so as to cross the two ends of said wire one over the other.

6. A machine for making bent wire clips and the like, such as clips for connecting together coiled upholstery springs, comprising a frame, a saddle member movable in said frame to and from an operative position, a reciprocatory cross head mounted on said frame, a stationary cutter member carried by the frame, having a wire feeding channel therethrough and an inclined surface providing a cutting edge disposed diagonally of the axis of said channel, means for feeding wire through said channel to a cutting position across the saddle member, a pair of wire bending jaws for bending a severed length of wire over the saddle member, one of said jaws being fixedly secured to the cross head, and the other jaw being pivotally secured to the cross head for movement toward and from the first jaw and provided with an inclined face, a wire cutting element associated with one of said jaws and having a diagonal cutting edge disposed complementarily to the cutting edge of said stationary cutting member, means for moving the cross head and jaws toward the saddle member to cause said cutting edges to sever a length of wire diagonally of its axis and to cause said jaws to bend such length of wire to substantially U-shape over the saddle member, means for retracting the saddle member to an inoperative position, a slidably adjustable abutment for engagement with the inclined face of the pivoted jaw upon movement thereof subsequent to the saddle retraction whereby said jaws may close the legs of the U-shaped wire together with their ends overlapping, and a screw device for adjusting the abutment to control the extent of such overlap.

7. A machine for severing lengths of wire from a stock thereof and for bending the severed lengths into wire clips, comprising an anvil, means for moving said anvil to and from an operative position, two bending jaws movable towards the anvil when the latter is in its operative position, to overlap it one on each side and thereby to bend a severed length of wire into U-form about said anvil, one of said jaws being pivoted for movement toward the other after the withdrawal of the anvil to inoperative position to close the clip, the other jaw being capable only of movement towards and away from the anvil position, a wire cutter comprising one cutter element on the second jaw and a stationary cutter element co-operating therewith and having a wire feed channel, said elements having cutting edges for severing a length from the end of the stock on a diagonal severance line, which edges are located diagonally to the wire and to said feed channel, a key and groove connection between the elements, which key and groove extend in the direction of the relative movement between the two elements in cutting, for restraining relative lateral movement of said elements in the cutting act, and means for moving the pivoted jaw towards the other jaw, after the retraction of the anvil, to an extent resulting in the ends of the U-shaped wire positioned between the jaws being caused to cross or overlap.

ARTHUR HENRY BINCH.